(12) United States Patent
Mellish

(10) Patent No.: X7812
(45) Date of Patent: Nov. 19, 1833

(54) TENONING MACHINE

(76) Inventor: Henry Mellish

Henry Mellish, of Walpole, N. H.
Letters Patent

The schedule referred to in these Letters Patent and making part of the same, containing a description in the words of the said Henry Mellish himself, of his improvement in the mortising machine —

---

Be it known that I Henry Mellish of Walpole, County of Cheshire & State of New Hampshire, have made an improvement in the useful arts, being a machine for mortising holes or openings in timber called "Mellishes mortising machine" which is described as follows: reference being had to the annexed drawings.
A. The Frame is constructed by mortising & tenoning together five posts, four rails, with the girts or bars necessary for connecting the parts; when put together it forms a frame of about 6 feet long, 3 feet high, & from 15 to 18 inches wide. the two front posts upon which the mortising chisels & carriage are placed, are about 6 feet high, the whole dimensions can be varied to suit the views of the construction — —
B. The main driving wheel is made of wood or metal about 2½ to 3 feet diameter & turns on an axle in the center of the frame; the axle turning on the frame — on one end of the axle is the driving pulley a for giving motion to the whole machine — c,c,c,c, are small pulleys for turning the different parts of the machine. viz. — of these two are put upon the crank axle; another on the axle upon which the endless screw is placed, & another upon the bit mandril —.
D. the double crank for working the chisels, this is supported & turns near the top of the front posts of the frame — two chisels b b, are attached to this crank by slides & sweeps, working alternately — The chisels work in a box, e, containing a spring to keep them in their places in front, & a spring follower to keep them steady sideways — The door, d, of the box turns on hinges, & is fastened with screws —
C. The carriage, upon which the timber to be mortised is placed; it is about 2½ or 3 feet long 4½ or 5 inches wide & 3 or 4 inches deep. This carriage rests upon the head of a T bolt, X, & is moved upwards by the lever K turning on a bolt or hinge fixed in an upright — In the center of the back board of the carriage is a score or mark, for showing how the timber shall be placed, so that the chisels shall strike in the proper place — In the front board are screws, e.e. for moving the follower for fastening the timber to be mortised –
F, The feeder or rack & pinion for moving the carriage – this is made of steel
or iron; having teeth or cogs in it & about 20 inches long – the shaft is made
square, except where a cam f, is placed at one end, this is round – a pinion g,
placed near the center, & turning on an axle, works into the feeder or rack, –
at the other end of the axle of the said pinion, is a cog wheel h, working into an
endless screw, i. – G, the lever & spiral spring, for throwing the pinion in & out
of the gear with the feeder – the lever turns on a hinge or pin on one ~~end~~ of the
cheeks of the frame – a spiral spring is attached to the lever & presses against the
other cheek or upright & throws the pinion out of gear – This lever passes over a
collar or neck, k, upon the axle of the pinion & by pressing against which the
axle (with pinion) is moved – H, Two gauges, for determining the length of the
mortise; these are placed on the same shaft with the rack, & are made to strike
a lever to be hereafter described; these gauges are set to a scale; and cause
the mortises to be cut to the required length –
I. a lever attached at one side to a strong wire or iron bar & turning on a
pin in the center, is so placed as to be struck by one of the gauges – a catch
l, connected with the lever for throwing the pinion in & out of gear holds
back the bar attached to the gauge lever – & a spring m, attached to the
cheek of the frame throws the catch with the bar out again – When it is
required to give a reverse motion to the carriage then a gauge on the
other end of the feeder shaft strikes a wire or bar connected with the upper
end of the gauge lever & produces the same effect as before described.
J. the mandrel or bit for boring holes is placed at the hinder end of the
frame & is turned by a band passing over a pulley fixed on the shaft of the
borer – There is a carriage n, put below the borer, which is moved up
& down by a screw, c. placed near the bottom of the frame — – –
Operation, The machinery having been put in motion, by any known
power; the timber to be mortised is placed on the mandrel carriage & a
round hole bored where the mortise is intended to be cut – it is then
placed on the mortising carriage the hole being put against the mark
on the back of the carriage or the follower – the carriage is then raised
by the lever & kept up by the T bolt in the foot piece, the chisels working alternately by the motion of the cranks make a square opening - the lever for throwing the pinion in & out of gear with the feeder is now moved forward by the band, & kept in its place by the catches - the carriage then commences moving horizontally till the gauge hits the lever or sliding bar; in a reversed operation the gauge at the other end of the feeder shaft strikes the bar which operates on the upper half of the turning lever, producing the same effect as before described - The carriage is moved by the cams falling into a groove on a cross piece fixed on the carriage. -

The invention here claimed & desired to be secured by Letters Patent consists of the before described machine taken as a whole or combination of the several parts; but particularly I claim the two chisels having shoulders for driving out the chips working alternately, on a double crank; the mode of giving motion to the carriage & of throwing it in & out of gear -

Done at the City of Washington this 24th day of September 1833.

Witnesses
Wm. P. Elliot
G. L. DeWitt

Henry Mellish ( Dr in portfolio 348 n d57

Exd
[illegible]

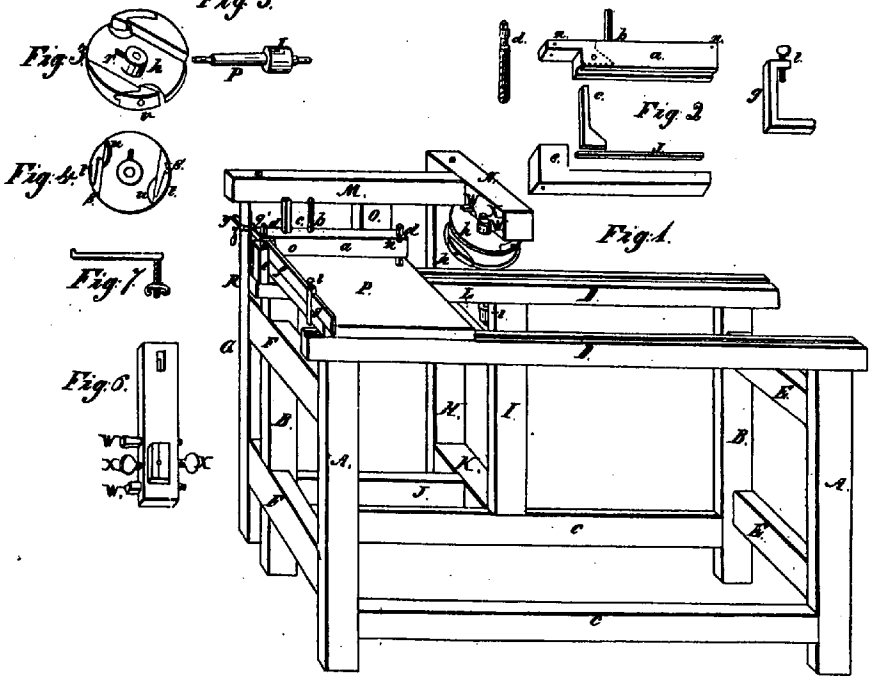

United States Patent
Patent No.: X7812
X7812
H. Mellish,
Tenoning Machine.
Patented Nov. 19, 1833.